(12) United States Patent
Zurko et al.

(10) Patent No.: US 7,036,022 B1
(45) Date of Patent: Apr. 25, 2006

(54) VERIFICATION OF TRUSTED-PATH COMMANDS

(75) Inventors: Mary Ellen Zurko, Groton, MA (US); Thomas Andrew Casey, Jr., Westwood, MA (US); Morrie Gasser, Saugus, MA (US); Judith Shelhorse Hall, Sudbury, MA (US); Clifford Earl Kahn, Framingham, MA (US); Andrew Halstead Mason, Hollis, NH (US); Paul Douglas Sawyer, Billerica, MA (US); Leslie Richard Kendall, Glouchester, MA (US); Steven B. Lipner, Wellesley, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/515,384

(22) Filed: Feb. 29, 2000

Related U.S. Application Data

(62) Division of application No. 07/479,666, filed on Feb. 13, 1990, now Pat. No. 6,507,909.

(51) Int. Cl.
*H04L 9/32* (2006.01)
(52) U.S. Cl. .................... 713/200; 713/189; 713/201
(58) Field of Classification Search ............. 713/152, 713/154, 160, 161, 164, 166, 176, 179, 181, 713/189, 200, 201, 202; 705/73, 74, 75, 705/76
See application file for complete search history.

(56) References Cited

U.S. PATENT DOCUMENTS

| | | | |
|---|---|---|---|
| 3,956,615 A * | 5/1976 | Anderson et al. ............. 705/72 |
| 4,005,386 A | 1/1977 | Seki et al. ................ 340/172.5 |
| 4,183,085 A | 1/1980 | Roberts et al. ............. 364/200 |
| 4,218,738 A | 8/1980 | Matyas et al. ............. 364/200 |
| 4,227,253 A | 10/1980 | Ehrsam et al. .................. 375/2 |
| 4,253,145 A | 2/1981 | Goldberg .................... 364/200 |
| 4,310,720 A | 1/1982 | Check, Jr. ................ 178/22.08 |
| 4,315,101 A * | 2/1982 | Atalla ........................ 705/75 |
| 4,328,542 A | 5/1982 | Anastas et al. ............. 364/200 |
| 4,405,829 A | 9/1983 | Rivest et al. ............. 178/22.1 |
| 4,430,728 A | 2/1984 | Beitel et al. ................ 364/900 |
| 4,442,484 A | 4/1984 | Childs, Jr. et al. .......... 364/200 |
| 4,486,828 A | 12/1984 | Kitamura et al. .......... 364/200 |
| 4,488,217 A | 12/1984 | Binder et al. ............... 364/200 |
| 4,531,023 A | 7/1985 | Levine ....................... 179/2 R |
| 4,584,639 A | 4/1986 | Hardy ....................... 364/200 |

(Continued)

FOREIGN PATENT DOCUMENTS

EP 326669 A2 8/1989

OTHER PUBLICATIONS

National Institute of Standards and Technology, "DES Modes of Operation," Dec. 2, 1980, FIPS PUB 81. Retrieved from the Internet:<http://www.itl.nist.gov/fipspubs/fip81.htm>.*

(Continued)

*Primary Examiner*—Justin T. Darrow

(57) ABSTRACT

A method for executing trusted commands, in which a trusted command is first received from a user at a user terminal and parsed by untrusted code; then passed to a trusted computing base for execution. The trusted computing base displays some indication of what is to be done back to the user for confirmation. Confirmation of the commands prevents unauthorized modification of the commands and increases system confidence. A randomly (or pseudo-randomly) generated process identifier is employed to verify the existence of a trusted path.

17 Claims, 7 Drawing Sheets

U.S. PATENT DOCUMENTS

| | | | |
|---|---|---|---|
| 4,593,353 A | 6/1986 | Pickholtz | 364/200 |
| 4,652,990 A | 3/1987 | Pailen et al. | 364/200 |
| 4,669,043 A | 5/1987 | Kaplinsky | 364/200 |
| 4,677,546 A | 6/1987 | Freeman et al. | 364/200 |
| 4,677,670 A | 6/1987 | Henderson, Jr. | 380/23 |
| 4,701,840 A | 10/1987 | Boebert et al. | 364/200 |
| 4,742,447 A | 5/1988 | Duvall et al. | 364/200 |
| 4,748,668 A | 5/1988 | Shamir et al. | 380/30 |
| 4,751,669 A | 6/1988 | Sturgis et al. | 364/900 |
| 4,754,326 A | 6/1988 | Kram et al. | 364/900 |
| 4,754,395 A | 6/1988 | Weisshaar et al. | 364/200 |
| 4,771,461 A | 9/1988 | Matyas | 380/24 |
| 4,794,515 A | 12/1988 | Hornung | 364/200 |
| 4,797,853 A | 1/1989 | Savage et al. | 364/900 |
| 4,799,061 A | 1/1989 | Abraham et al. | 340/825.34 |
| 4,799,153 A | 1/1989 | Hann et al. | 364/200 |
| 4,829,469 A | 5/1989 | Germaine et al. | 364/900 |
| 4,858,117 A | 8/1989 | DiChiara et al. | 364/200 |
| 4,885,789 A | 12/1989 | Burger et al. | 380/25 |
| 4,918,653 A | 4/1990 | Johri et al. | 364/900 |
| 4,926,476 A | 5/1990 | Covey | 380/4 |
| 4,945,468 A | 7/1990 | Carson et al. | 364/200 |
| 4,962,533 A | 10/1990 | Krueger et al. | 380/25 |
| 5,073,933 A * | 12/1991 | Rosenthal | 713/156 |

OTHER PUBLICATIONS

Microsoft Press Computer Dictionary, 1997, Microsoft Corp., 3rd Ed., p. 101, 355.*

Wiseman, et al., *The Trusted Path between SMITE and the User, IEEE Symposium on Security and Privacy* at 147-155 (1988) (published in the U.S.A.).

Ames et al., *Security Kernel Design and Implementation: An Introduction*, IEEE Computer, pp. 14-22 (Jul. 1983).

Krager et al., *A VMM Security Kernel for the VAX Architecture*, (unpublished draft of Jan. 11, 1990).

Atkins, D.E., *Design of the Arithmetic Units of ILLIAC III: Use of Redundancy and Higher Radix Methods*, IE Transactions on Computers, vol. C-19, No. 8, Aug. 1970, pp. 720-733.

Dunford, *FILER*, Version 2.20 User Documentation, (May 14, 1986).

McCauley et al., *KSOS: The Design of a Secure Operating System*, Version 1.2 (1979), *UNIX Operating System*.

Dept. of Defense, "Dept. of Defense Trusted Computer System Evaluation Criteria," Dec. 26, 1985. Retrieved from the Internet:<URL: http://csrc.ncsl.nist.gov/secpubs/rainbow/std001.txt>.

* cited by examiner

VERIFICATION OF TRUSTED-PATH COMMANDS

CROSS-REFERENCE TO RELATED APPLICATIONS

This application is a divisional of application Ser. No. 07/479,666 filed Feb. 13, 1990, now U.S. Pat. No. 6,507,909.

1. BACKGROUND OF THE INVENTION

1.1 Introduction

This invention relates to a method for improving security in a computer system. More specifically, this invention concerns a method for implementing trusted commands through both trusted and untrusted code.

1.2 Background

The proliferation of computers has resulted in the need for reliable computer security systems. The need to protect certain information is great in areas dealing with national security, for example. Security measures are required in other fields, including areas which utilize financial, medical, and personal information. Many computerized information systems therefore include internal security measures which provide the users with different levels of access to the computerized information, and which attempt to provide at least a degree of protection of the information from undesirable access.

1.3 Security Criteria: Reference Validation Systems

In response to the need for secure computer systems, the Department of Defense has issued a publication titled *Department of Defense Trusted Computer System Evaluation Criteria* (reference No. DOD 5200.28-STD). This publication is sometimes referred to as the "Orange Book," and is available from the Department of Defense. The Orange Book describes system security objectives and evaluation criteria for secure computer systems.

A "secure" computer system generally includes some type of "reference validation" system. These reference validation systems (known as reference monitors) are responsible for enforcing the security rules (security policy) for a given computer system.

Reference monitors mediate all access to "objects" by "subjects". Objects are passive entities that contain or receive information. Access to an object implies access to the information that it contains. Subjects are active entities, generally in the form of a person, process or device that cause information to flow among objects or change the system state. A subject may ordinarily reference its own, subject-internal information without the involvement of the reference monitor. Reference monitors controlling such access to objects by subjects are known in the art, and may utilize a security kernel approach.

Proper implementation of a reference monitor calls for adherence to three principles:
 (1) completeness, in that all access by subjects to objects or other subjects must involve the monitor;
 (2) isolation, in that the monitor must be protected from tampering; and
 (3) verifiability, in that correspondence must be shown between the security policy and the actual implementation of the monitor.

As discussed, every reference to information or change of authorization should go through the reference monitor. Thus, all commands issued by a user or other subject are monitored by the reference monitor. This approach is particularly useful in multiuser computer environments.

The totality of the protection mechanisms within a computer system—including hardware, software, and firmware, the combination of which is responsible for enforcing a security policy—is commonly known as a "trusted computing base" (TCB). If the trusted software is designed to be as simple as possible, for the sake of verifying the reference monitor, then the trusted software is known as a "security kernel".

Generally, TCBs attempt to meet the control objectives set out in the Orange Book. Compliance with these objectives inspires user confidence, and increases the overall desirability of a computer system. These objectives deal with:
 (1) security policy;
 (2) accountability; and
 (3) assurance.

The security policy objective entails enforcement by the TCB of the desired security rules. These security rules are designed to limit the access to and dissemination of information in a precisely defined manner.

Security policies may include provisions for the enforcement of both mandatory and discretionary access control rules. Mandatory access control rules control access based directly on comparisons of the user's security level and the sensitivity level of the information being sought. Discretionary access rules control and limit access to identified individuals who have been determined to have a need-to-know.

These access control rules call for associating with each user identification code a statement indicating the user's access rights. This statement often includes information representing the user's security level (for mandatory control purposes), and membership in groups (for discretionary control purposes).

The accountability objective calls for providing each user with an individual user identification code (often called a "user name") and for the TCB to be able to recognize the code and ensure that it is being used by its proper user. This may be done by checking the user's password. This ensuring the user's identity is known as "authentication."

In addition, the accountability requirement calls for the existence of auditing capabilities. Such capabilities allow for the auditing of actions which can cause access to, generation of, or release of classified or sensitive information.

1.4 Assurance Objectives and "Trusted" Systems

The assurance objective is especially important in the present context. That objective is concerned with taking steps to ensure that the security policy is correctly implemented and that the TCB accurately mediates and enforces the intent of that policy. Steps may be taken to insure that each portion of the TCB is assured. To accomplish this objective, two types of assurance are needed.

The first type of assurance is life-cycle assurance. This type of assurance refers to steps taken to ensure that the computer system is designed, developed, and maintained using formalized and rigorous control standards.

The second type of assurance is operational assurance. Operational assurance deals with the features and system architecture used to ensure that the security policy is uncircumventably enforced during system operation. All of the software (sometimes referred to informally in the art as "code") in the TCB is generally analyzed to determine the assurance level of the system.

As the amount of code in the TCB increases, it becomes more difficult to ensure that the TCB accurately enforces the security policy. Because of this, it is desirable to minimize the amount of trusted code, and thus the complexity of the TCB.

A TCB is usually operated with a substantial amount of software, such as text editors and other applications, operating within the security policy of the TCB. Generally, this untrusted software asks the TCB for access to objects when the user or the untrusted software requires them. Thus, the majority of user's requests to the TCB, and the majority of the information that a user obtains from the TCB, are handled through the agency of untrusted software.

This untrusted software, however, is by nature in danger of compromise and vulnerable to bugs. For some types of requests and displays, malicious or malfunctioning untrusted software could compromise the enforcement of the security policy. Generally, TCBs cannot distinguish between requests faithfully made by the untrusted software on command from a user and either requests made by the untrusted software at its own initiative or requests that misrepresent the user's actual command. For example, if commands issued by an authorized user to change certain users' security levels were made through the agency of untrusted software, it would be possible for malicious or malfunctioning untrusted software to inappropriately raise the security level of a user. Such inappropriate raising of a security level could result in the disclosure of sensitive information.

Furthermore, TCBs generally cannot ensure that displays made by untrusted software are faithful. This poses problems in that if displays of audit records were made through the use of untrusted software it would be possible for malicious untrusted software to misrepresent these audit records to hide suspicious activities.

To overcome these problems, prior-art systems have developed a concept known as a "trusted path." A trusted path is a mechanism by which the user can communicate directly with the TCB. A trusted path may only be activated by the user or the TCB and cannot be imitated by untrusted code. Such a trusted path is a positive TCB-to-user connection that bypasses all untrusted software. The Orange Book requires a trusted path for all systems to have a security rank of B2 or above.

A "trusted command" (also known as a trusted-path command) is a command which requires a trusted path between the user and the TCB for execution. The specific security policy of a computer system will determine which commands are defined as trusted commands. For example, commands relating to changes of the security levels of users would be trusted commands.

1.5 Parsers as Increasers of System Complexity

Because of perceived performance problems, prior-art computer systems often included code to implement certain functions in the TCB. One such function comprises a portion of code known as the "parser."

The parser performs the basic interpretation of user commands by translating a human-readable representation of a user command (e.g., a command typed by a user at a keyboard) into a machine-readable representation known as the binary representation, or the parsed command. A user command may consist of a group of words, typed by the user, specifying some action to be taken. The user command may also specify one or more variations or options of that action.

For the convenience of the user, most parsers allow these option words to be typed in any order without changing the meaning of the user command. Also, most parsers allow the user to type the words in either full or abbreviated form. In some instances, several possible abbreviations exist. Further, in most parsers, the user may vary the spacing between the words without changing the meaning of the command. Some parsers also check user commands for proper syntax, and report errors to the user prior to execution of the command. Other parsers prompt the user for missing information, avoiding the need to completely retype an incomplete command.

Thus, several different inputted human-readable representations may be associated with each unique parsed command. It is the job of the parser to translate accurately these inputted representations of user commands (which may vary with each user) into specific parsed command representations. Due to the complex nature of parsing, large amounts of computer code are generally associated with this activity.

Prior-art trusted software systems have included the parser for trusted commands, and thus the associated code, within the TCB. In these systems every trusted command was parsed and executed exclusively by trusted code. The inclusion of the parsing code in the TCB was regarded as necessary for proper system operation.

As discussed above, however, the ease and degree of assuring a system is roughly inversely proportional to the complexity of the system's TCB. Thus, the inclusion of the parser in the TCB results in more complex assurance analysis and a corresponding decrease in system confidence. Prior art devices (since they needed to be small and simple to support assurance) have thereby inherently constrained the user-friendliness of computer systems.

2. SUMMARY OF THE INVENTION

The present invention provides a number of advantages over the prior art. By reducing the complexity of the TCB, the amount of trusted code that must be verified or assured is reduced. In addition, the general usability of the system is increased, because the improved method of processing trusted commands allows for the implementation of added computing functions at little or no additional cost in TCB assurance.

The present invention includes an improved method for the execution of trusted commands. In this improved method, the required steps for processing a trusted command are split between trusted and untrusted code. In this manner the amount of trusted code in the TCB may be significantly reduced.

As discussed above, the parsing of a command can be comparatively difficult, and often requires large amounts of complex code. However, it is relatively simple to translate the parsed representation of a command into a standard human-readable representation for display to the user. This is in part because a single, standard human-readable display representation may be associated with each parsed representation. The present invention takes advantage of this fact by parsing the trusted commands in untrusted code prior to execution in the TCB.

In general the present invention includes a computer system which includes a TCB operating as a reference monitor. Included in the TCB is the security-relevant code necessary for the actual execution of a trusted command.

Associated with the TCB are one or more untrusted subjects (e.g. processes). Each such subject has particular access rights, which may include a security level. These untrusted subjects communicate only with the involvement of the TCB. The TCB allows communication only as permitted by the system's security policy. Each untrusted subject is substantially independent.

In each of these untrusted subjects, untrusted software is generally run. This untrusted software may include an untrusted operating system (UOS), and generally includes applications such as text editors. In the present invention, the untrusted code includes the non-security relevant functions necessary for the execution of a trusted command.

Attached to the computer system are several user terminals. These user terminals allow the user to exchange information with the computer system. All terminal activity is seen first by the TCB. A secure-attention key is dedicated for use on each terminal attached to the computer system. The TCB is designed to recognize and trap this key signal. Activation of this key by the user establishes a trusted path between the user terminal and the TCB. Alternate methods for establishing a trusted path may be utilized.

The TCB is generally provided with a limited number of "direct" user commands (direct commands). Because of this, the majority of the user's activities will take place in the untrusted operating system.

While operating in the UOS, the user may attempt to execute a trusted command. When one of these commands is issued by the user, the untrusted code in the UOS checks the syntax of the command and may prompt for missing parameters; then the untrusted parser converts the command into a parsed representation that will be referred to here for convenience as the "binary representation." In some instances, command procedures and application-issued trusted commands will also be parsed and translated into a binary representation.

This binary representation is then passed from the UOS to the TCB. The TCB initially associates the binary representation with a physical terminal and copies the binary representation into a memory buffer assigned to that terminal.

Once this has been completed, the untrusted code in the UOS may prompt the user to activate the secure-attention key. If this key is activated, a trusted path will be established between the user terminal and the TCB. Alternate methods may be employed to initiate this trusted path. A randomly generated process ID, which may be generated at login, may be utilized to prevent untrusted code from simulating a trusted path.

Subsequent activity by the TCB depends on the type of command that is represented by the binary representation. If the command is one that will not modify any information, i.e., a request to view information, the TCB verifies that the user has the necessary access rights, and attempts to execute the binary representation. A human-readable standard representation of the binary command received by the TCB is displayed along with the information.

In most instances, if the command requested by the user requests modification of information, the TCB displays for confirmation a standard human-readable form of the command, along with an indication of what the result of command execution will be. The user is then requested to confirm (by typing a response via the trusted path) that the displayed command was received correctly and should be executed.

This confirmation allows the user to ensure that untrusted code has not performed an unauthorized modification of the user's original command. Also, confirmation allows for the detection by the user of any errors that may have occurred during the parsing process. In situations where the binary representation represents a command procedure or an application-issued trusted command, the confirmation ensures that the command proposed by the untrusted software is acceptable to the user.

If the command is confirmed by the user, the TCB checks to ensure that the user has the necessary access rights to execute the command and, if so, attempts to execute the command.

A distinct advantage of the present invention arises from the fact that the execution of a trusted command is split between trusted code and untrusted code. The actual parsing of the command occurs in untrusted code. The trusted code included in the TCB checks the parsed command for correctness and displays it to the user in human readable form. This checking and display of a parsed command requires substantially less code than is required to parse a command.

Thus, since the command parser is included in the untrusted code, the amount of trusted code in the TCB is minimized. This lowers the difficulty of trusted system assurance, and increases the amount of confidence that may be placed in a system.

It is a further advantage of this invention that the user interface is separate from the underlying functions performed by the TCB. This allows for implementation of alternate UOS-to-user interfaces without major modification of the TCB. Further, the amount of time and effort to develop such a command interface is reduced. A still further advantage is that more useability features may be provided without substantial increasing the complexity of the TCB. Examples of such useability features are command line editing and recall.

3. BRIEF DESCRIPTION OF THE DRAWINGS

4. DESCRIPTION OF SPECIFIC EMBODIMENTS

A specific embodiment of the present invention is described with respect to a computer which supports various user processes and may operate in a multiuser environment. As an illustration, an implementation in connection with a VAX model computer, available from Digital Equipment Corporation (DEC), is briefly described. It should be understood that the present invention may be readily applied to various types of computer systems including PC networks, stand-alone multiuser computer systems, or single user computer systems, to name a few examples.

4.1 Overview of Software Architecture

Figure 1:
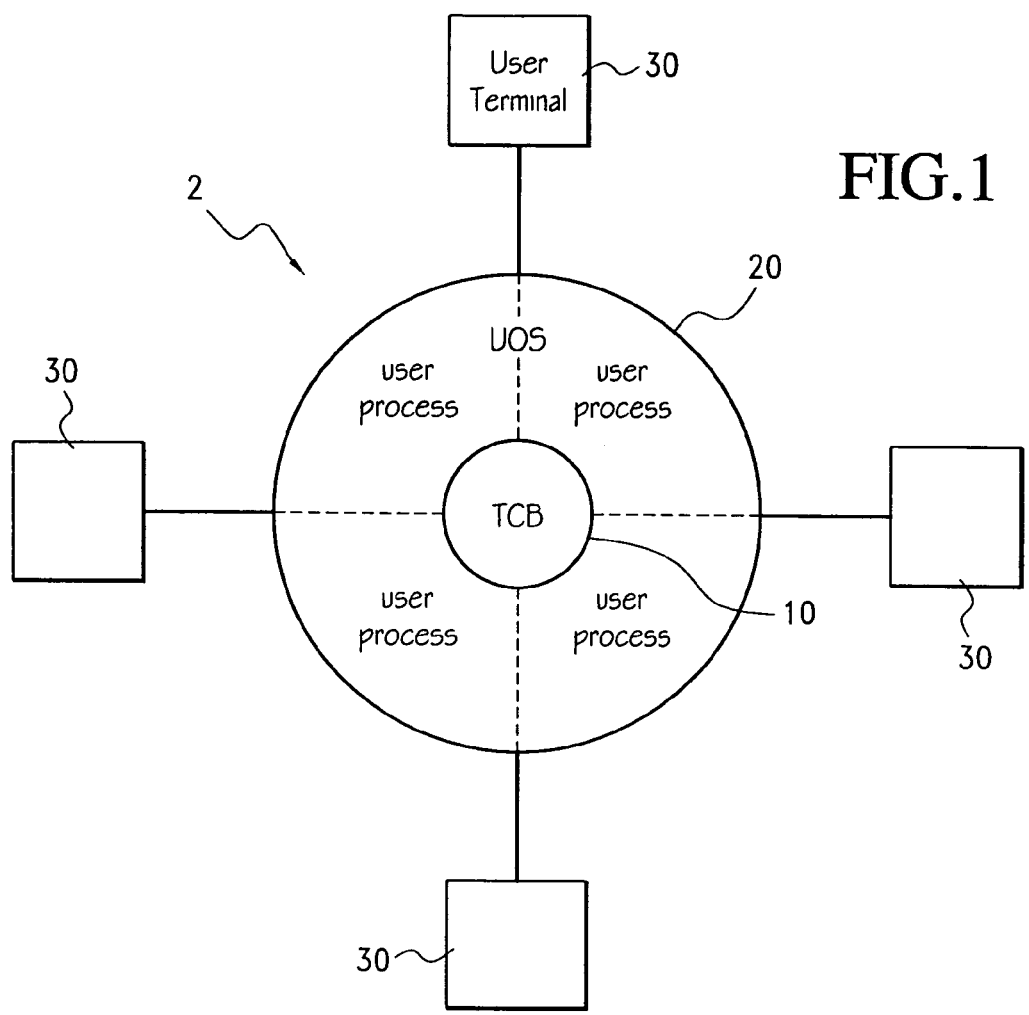
FIG. 1 illustrates the various levels within a computer system.

FIG. 1 illustrates a preferred computing environment which is generally designated by the reference numeral 2. A trusted computing base (TCB) 10 resides at the center of the computer system. The TCB 10 acts as a reference monitor in that access to information is mediated by the TCB 10.

In a general embodiment of the invention, the TCB 10 may be a secure kernel residing under the general operating system of a computer system. In one embodiment, the TCB 10 comprises trusted code residing underneath a VMS or Ultrix system.

The TCB 10 enforces a security policy which identifies permissible modes of access between users or computer processes (subjects) and files, memory segments or other objects. Access to stored information is mediated by the TCB 10, so that the TCB 10 may determine whether a particular user or untrusted subject can access particular information. In order for the TCB 10 to fulfill its protective function, it must take into account the three requirements discussed above: (1) completeness, (2) isolation, and (3) verifiability.

Figure 2:
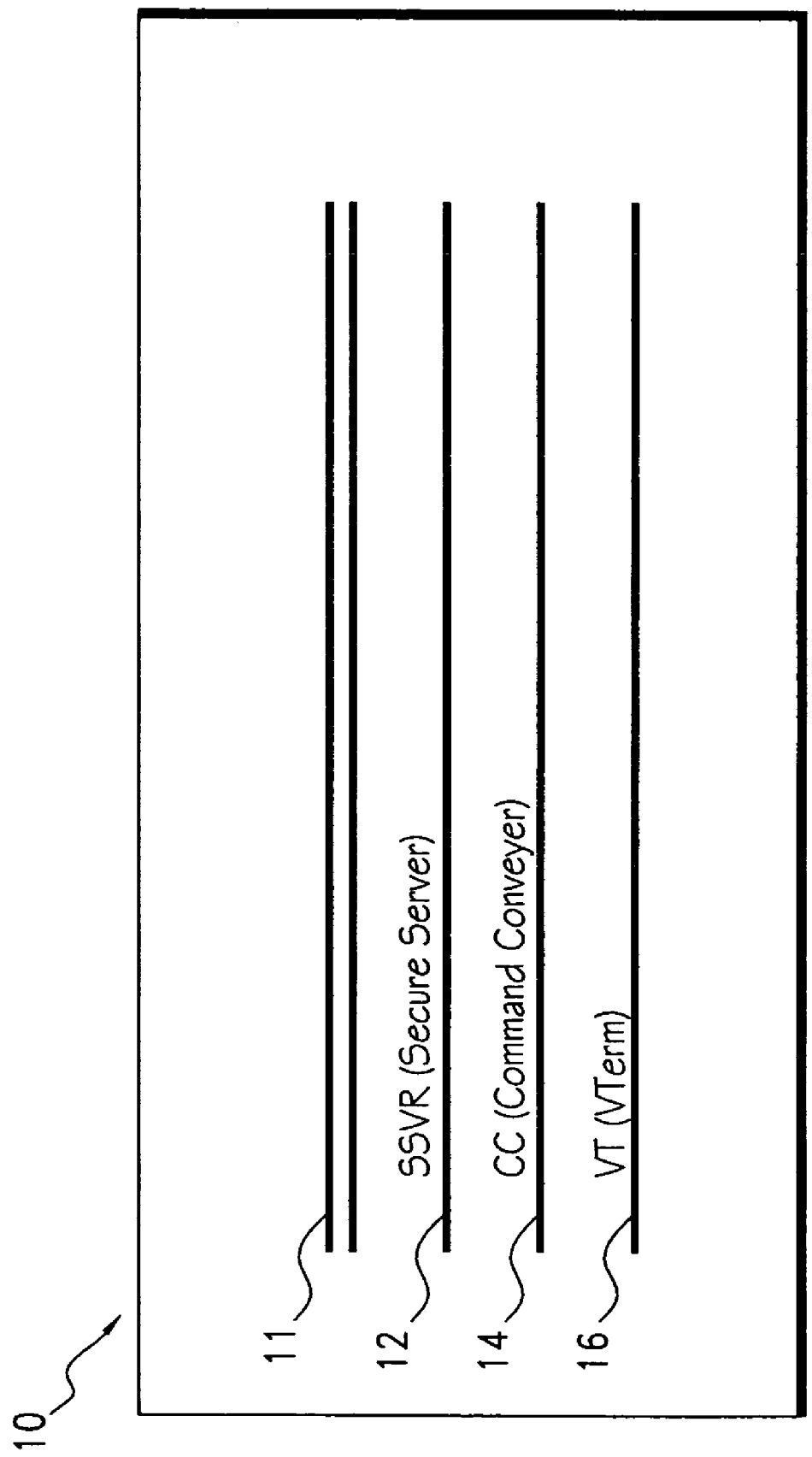
FIG. 2 illustrates various layers within the trusted computing base.

A more complete understanding of the TCB 10 may be obtained by reference to FIG. 2. As is illustrated, the TCB 10 may comprise several distinct layers. Each layer of the TCB 10 comprises trusted code. This trusted status is indicated by the security boundary 11. In one embodiment, layers of particular interest are the layers to be referred to as: secure server (SSVR) 12, Command Conveyor (CC) 14, and VTerm (VT) 16.

The TCB 10 includes the trusted code necessary to ensure compliance with the Orange Book requirements. In alternate embodiments, the trusted code may ensure compliance with different systems of security requirements. The TCB 10 also includes the code which actually executes the requested trusted command, as discussed below.

Each untrusted subject is generally supported by an untrusted process. This process may spend time in one of two "modes." The first mode, in which the process usually runs, is known as a "user mode." This mode is a restricted hardware state such as the VAX user mode that is known in the art. This process may also spend time executing trusted code in an all-powerful hardware state. This state is represented by the VAX "kernel mode", which is known in the art. This state may be triggered by a request by the untrusted subject of the security kernel. Such a request may be made in a conventional manner and is commonly called a "kernel call." This mode may also be triggered by asynchronous events (e.g. the completion of an Input/Output request previously made by the untrusted subject).

In one embodiment, the TCB 10 also has one process associated with each terminal that communicates with the user over the trusted path. This process is known in the art as an "execution thread." In this embodiment, each execution thread shares its address space with other TCB execution threads. An advantage of such sharing is economy of machine resources. Full-blown processes, each with its own address space, would require far more machine resources than if such address space sharing is employed.

It is the CC 14 which provides the interprocess communication for passing parsed commands between the processes that support the untrusted subjects, and the processes within the TCB 10 that support the trusted path.

The untrusted code may submit to the TCB 10 the parsed representation of the trusted command by making a kernel call. The kernel call causes the process supporting the untrusted subject to switch to the all-powerful hardware state and to begin to execute trusted code designed to handle kernel calls. This trusted code recognizes the nature of the kernel call and calls the CC 14. The CC 14 then obtains and copies the binary representation of the trusted command into protected memory and puts it in a global data structure that supports the user process associated with the terminal in question.

The VT 16 layer includes the trusted code which monitors all terminal activity and checks for activation of the secure-attention key. In one particular embodiment, the VT 16 layer also includes code which tracks which physical terminal is associated with a particular user or untrusted subject.

The specific manner of implementation of the above described activities will be apparent to one skilled in the art having the benefit of this disclosure.

Figure 3:
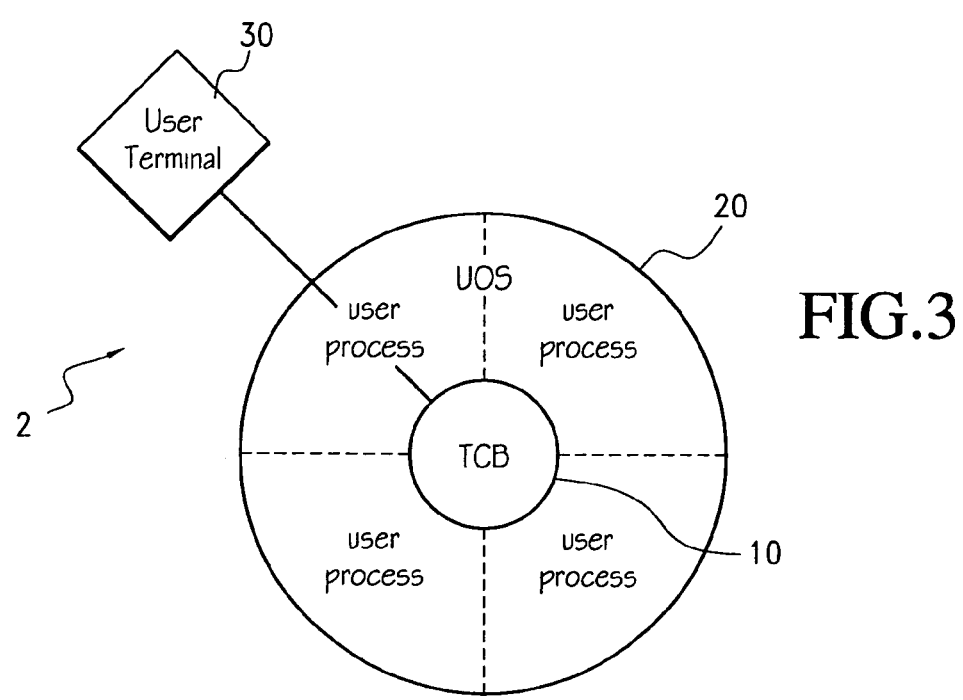
FIG. 3 illustrates a trusted path.

Referring to FIGS. 1 and 3, "around" the TCB 10 is a general untrusted operating system (UOS) 20. The UOS 20 generally comprises untrusted code and may include a traditional operating system such as Ultrix or VMS. Alternate constructions are envisioned where the UOS 20 includes any untrusted code. It will be appreciated that the system may include untrusted code that is separate from TCB 10 and UOS 20.

Most user activity will occur in the UOS 20. In one embodiment, a specific UOS 20 may run in each untrusted subject.

4.2 User Terminals and the Secure-Attention Key

Associated with the computer system are one or more user terminals 30. These terminals 30 may be conventional in construction, in that they allow the user to exchange information with the computer system. Either "intelligent" or "dumb" terminals may be used. Examples of such dumb terminals are the well-known VT series 200 and 300 terminal. These terminals are available from Digital Equipment Corporation or its authorized dealers.

A particularly useful terminal includes control programming that is designed with security features in mind, such as is described in a co-pending U.S. patent application entitled "Method for Securing Terminal and Terminal Apparatus for Use with the Method," Ser. No. 456,672, filed by Wei-Ming Hu, Clifford E. Kahn, Andrew H. Mason, and Peter A. Sichel on Dec. 26, 1989 and to be commonly assigned with this application.

A keyboard is attached to each user terminal. Each keyboard includes a key employed as a secure-attention key. This key is utilized to establish a trusted path between a user terminal and the TCB 10. In one embodiment, the secure-attention key is an "out-of-band key" for the UOS 20. It is desirable that the signal sent by the terminal upon activation of the secure-attention key is generally not utilized by the applications running in the UOS 20. An out-of-band key is convenient since it does not restrict the traditional number of user keys and the signal is sent immediately, even if other I/O is pending. For example, the secure-attention key may be the BREAK key on the terminal keyboard.

In many terminals (such as the VT 2XX and VT 3XX families) locking of the keyboard prevents the transmission of several key signals. In these terminals, however, the BREAK key signal may be transmitted, even from a locked keyboard. Thus it is generally desirable to employ the BREAK key as the secure-attention key. Also, the signal generated by activation of the BREAK key comes in ahead of other characters in the keyboard buffer. A further advantage of utilizing the BREAK key is that software running in the UOS 20 cannot get the terminal to send that character.

4.3 The Trusted Path and Direct Commands

The TCB 10 generally operates as a reference monitor. Upon initial login or at other times when the user is not connected to a process in the UOS 20 (e.g., an application program), the TCB 10 responds to a comparatively limited series of "direct commands," which may include a CONNECT command to connect to an untrusted subject. When the user is connected to such an untrusted subject, the TCB 10 checks for the secure-attention signal; if a signal other than the secure-attention signal is received, the TCB 10 passes the signal to the connected untrusted subject.

As discussed above, in one specific embodiment the trusted code in the VT layer 16 monitors all terminal activity. When the code in the VT 16 notices that the BREAK key has been depressed, the SSVR is signaled in a conventional manner (such as by advancing an event count or activating a flag). Code in the SSVR 12 recognizes this signaling and establishes a trusted path between the user terminal and itself. In this manner, the secure-attention key signal is trapped by the TCB 10.

In certain security environments, general security requirements mandate that the TCB 10 make displays when a trusted path is established and exited by the user. In one embodiment, when a trusted path is established, the TCB 10 sends a reset command sequence to the physical user terminal 30 to assure that it is in a known state. This is done in part to ensure that the information displayed to the user by the TCB 10 is in the intended form, (e.g., correct font). A particularly useful sequence of commands to implement the reset command sequence is described in the aforementioned copending U.S. patent application by Hu et at.

When the secure-attention key is activated, other than in connection with the issuance of a trusted command, the secure server 12 displays a particular banner and prompt (for example: "SSVR>" together with the user's process identifier, discussed below), to indicate that the user is conversing interactively with trusted code. If the secure-attention key was activated in connection with the issuance of a trusted command, the secure server 12 displays to the user some indication of what is to be done, as discussed below.

When command execution is complete, or when the user establishes or reactivates a session with the UOS 20, the TCB 10 issues a message to inform the user that he/she is breaking the trusted path. When a session with the TCB is complete, the memory in the physical terminal may be cleared by the TCB. This is done to protect trusted information from both untrusted code and unclassified persons who may later use the terminal. A particularly advantageous method of clearing the terminal memory is described in the aforementioned co-pending patent application.

The number of direct user commands available from the TCB 10 is preferably limited to reduce the complexity of the TCB 10. Generally, a command is direct if:

a. one needs the command when one is not connected to an untrusted subject;

b. end users depend on the command's correct behavior for security (e.g., LOGOUT); or c. the command must be issued when no user process in the UOS 20 is running.

In most cases, the user will converse with the TCB 10 through the SSVR 12. In one embodiment the user conversing with the SSVR 12 may be restricted to commands which allow him/her to establish (connect) or end (disconnect) a computing session in the general UOS 20. Further commands may be added, such as allowing the user to view the existing UOS 20 sessions or change his or her password, but it is generally desirable to limit the number of available commands in the TCB 10. It is further desirable to ensure simplicity in the syntax of these direct commands.

The simple syntax of the direct commands, and the comparatively small amounts of code necessary to interpret these commands, do not substantially increase the complexity of the TCB 10.

4.4 Login Processing by the TCB

To initiate a computing session in the illustrative UOS 20, the user may first login to the computing environment through the SSVR 12. To initiate a login, the user activates the secure-attention key (or performs some other action to gain the attention of the SSVR 12). As discussed above, this establishes a trusted path between the user terminal and the TCB 10. Alternate embodiments are envisioned wherein other methods are employed to establish a trusted path.

Once a trusted path has been established, the SSVR 12 prompts the user for his/her specific user name and password. The various layers in the TCB 10 perform well-known security checks to ensure that the user has the necessary access rights to login at the terminal. If the user possesses the required access rights, a computing session is established in the SSVR 12.

At this time, the user's security information is stored by the TCB 10. The TCB 10 also stores in memory a unique identifier of the user process. This information is maintained in memory by the TCB 10 as long as the user has an active session.

4.5 Connection to Untrusted Process

Because the number of direct user commands in the TCB 10 is preferably limited, the user will generally choose to establish a computing session with an untrusted subject. Such an untrusted subject may include application programs residing in the UOS 20.

In one specific embodiment, when the user establishes a computing session in the UOS 20, the user's physical terminal 30 is associated with a virtual terminal of the UOS. The user converses with the untrusted subject through a computing session within the UOS 20. When such a connection with an untrusted subject is made, the VT layer 16 of the TCB 10 stores in memory which physical terminal 30 is associated with which virtual terminal in an untrusted subject. In this manner, trusted commands received from an untrusted subject may be attributed to the actual user at the physical terminal 30. Once the user has established a computing session within the UOS 20, normal computing activities may be carried out.

Figure 4A:
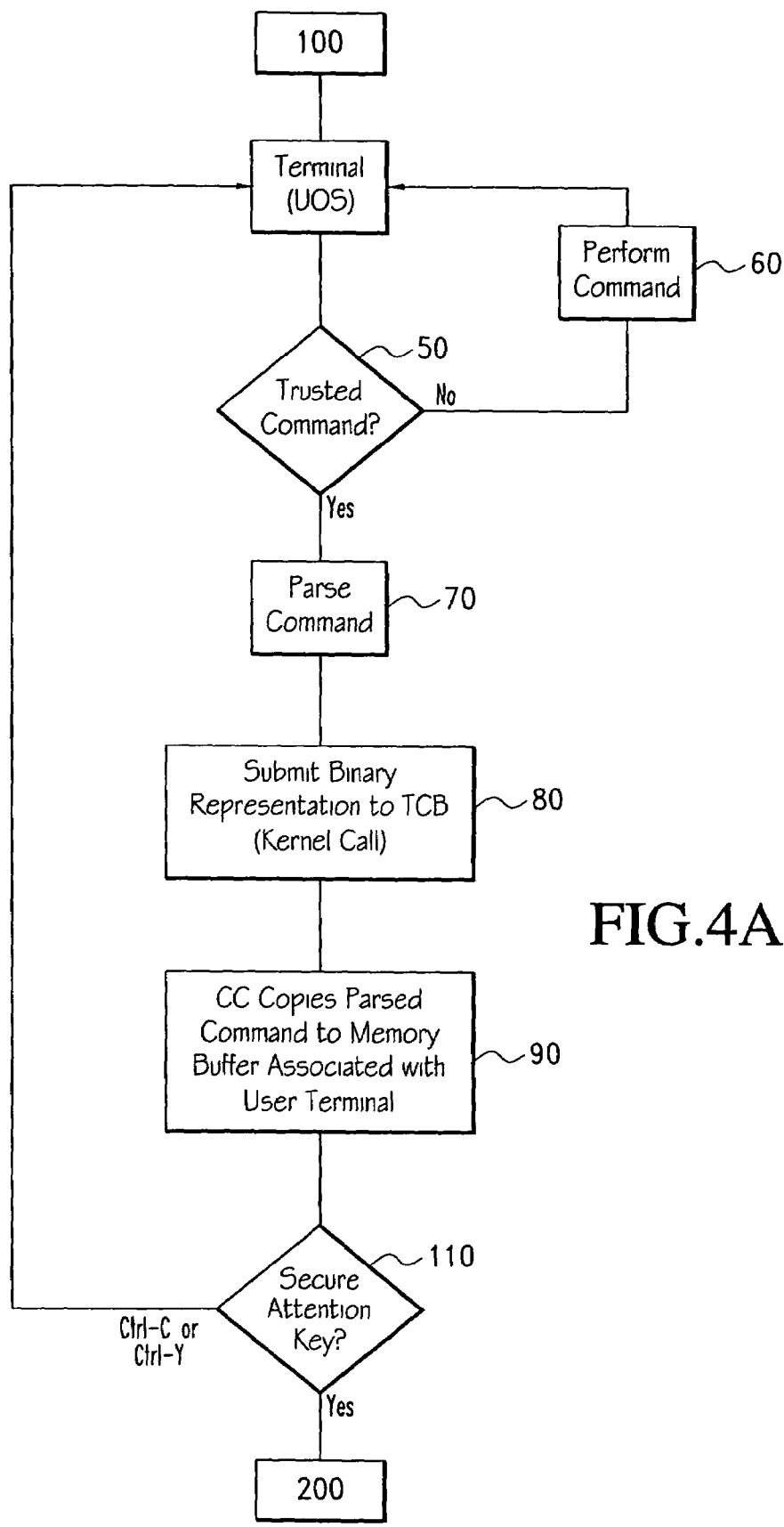
FIGS. 4A and 4B are flow diagrams representing a method for processing trusted commands. Differences in box representation in these drawings is explained below.
Figure 4B:
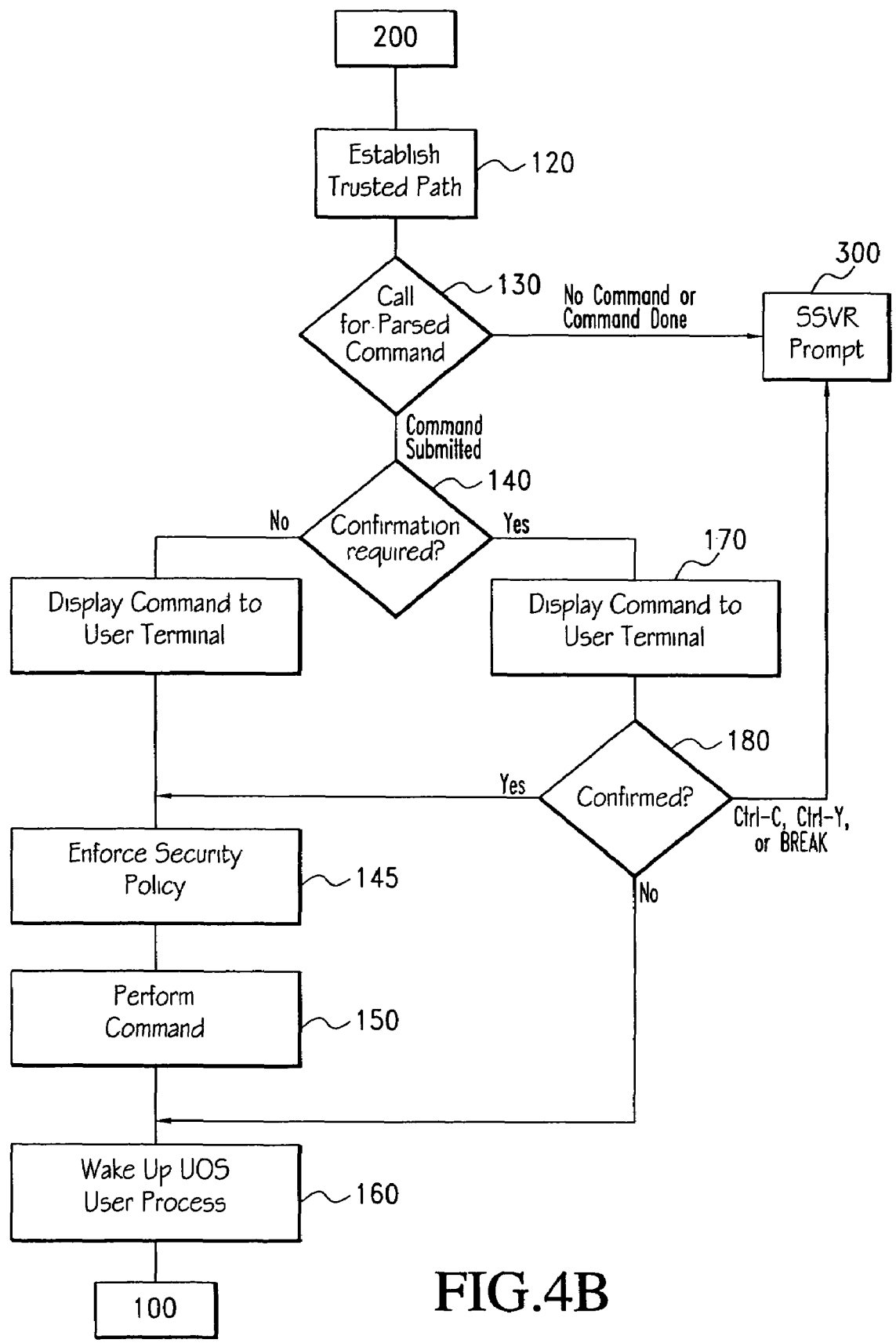

A more detailed understanding of these activities may be obtained through reference to FIGS. 4A and 4B. Activities indicated by heavily bordered blocks are performed by the TCB 10, or trusted code. Activities represented by lightly bordered blocks are performed by untrusted code.

In FIG. 4A, the user terminal is represented as having established a computing session 100 within the general UOS 20. During the session, the user may attempt to execute various commands. Utilities within the UOS 20 determine whether the issued commands are trusted commands 50. If the command is not identified by the UOS 20 as a trusted command, the UOS 20 attempts to perform the command at process 60. In these cases the operation and existence of the TCB 10 may have little effect on the command's behavior as seen by the user.

4.6 The Process Identifier

In one embodiment, a process identifier (process ID) is associated with each user process at the time of login. This process ID is a pseudo-randomly generated alpha-numeric tag which is associated with the user throughout his/her computing session.

The process ID is useful if the untrusted code can temporarily disable or delay the effect of activation of the secure-attention key. For example, untrusted code can send a reset command to some terminals. While these terminals are resetting, activation of the secure-attention key has no effect. Such a technique may allow untrusted code to trick the user into thinking a trusted path had been established when it had not been. The process ID inhibits such trickery by allowing the user to distinguish between actual and emulated trusted paths.

When the user first logs in, he/she will not yet know the process ID and cannot detect a false trusted path. However, to simulate a login dialogue, untrusted code would have to guess when the user activated the secure-attention key, or somehow detect the activation of the key even though the TCB could not detect it. Guessing the activation time is impracticable, because users start login dialogues at their own convenience and give no advance signal to the TCB prior to activation of the secure-attention key. Detecting the secure-attention key even though the TCB could not detect it would be possible only by causing the key to yield a signal different than the TCB expects. Methods to prevent such an event are described in the co-pending application by Hu et al., referenced above.

With some terminals, the untrusted code may be able to program the terminal so that the secure-attention key generates a signal that is recognizable to the untrusted code, but not to the TCB. In these cases, generation of the process ID at the time of login would be unsatisfactory. Instead, the process ID may be generated prior to user login. For example, in these embodiments, the process ID may be generated when the user is registered with the TCB 10 and stored in protected memory. In this embodiment the user may be given a way of changing his/her process ID, just as the user can generally change their password.

In one particular embodiment, when the user logs in the SSVR 12 pseudo-randomly generates a process ID and assigns this ID to the specific user at the physical terminal. Methods of generating pseudo-random identifiers are generally known in the art. In one embodiment, the random number initial seed is based on a hardware (as opposed to a software) event. The algorithm for generating successive random numbers should be computationally difficult to invert.

This process ID is maintained in the TCB and is never provided to untrusted code. Thus, untrusted code in the general UOS 20 is prevented from discovering the specific process ID assigned to the user.

The user is responsible for noting and retaining his/her assigned process ID. To promote user retention the process ID may be generated as a pronounceable group of characters. Methods for such generating pronounceable passwords are described in "A Random Word Generator", MITRE Technical Report (MTR-3006), May, 1975, by Morrie Gasser.

The process ID is displayed to the user when a trusted path is established between the user terminal and the SSVR 12. Displaying the ID serves a useful security function as it inhibits untrusted code from "spoofing" the user. Absent the process ID it may be possible for an untrusted subject to emulate the SSVR 12. An untrusted subject, emulating the SSVR 12, may be able to trick the user into divulging security-relevant information or otherwise compromising system security.

The process ID, known only to the user and the SSVR 12, inhibits this type of "spoofing." Before the user responds to an apparent SSVR 12 request, he/she will first verify that the proper process ID is displayed. Since the process ID is known by only the user and the SSVR 12, it is extremely difficult for an untrusted subject, ignorant of the process ID, to fool the user into believing that he/she is conversing with the SSVR 12.

Figure 6:
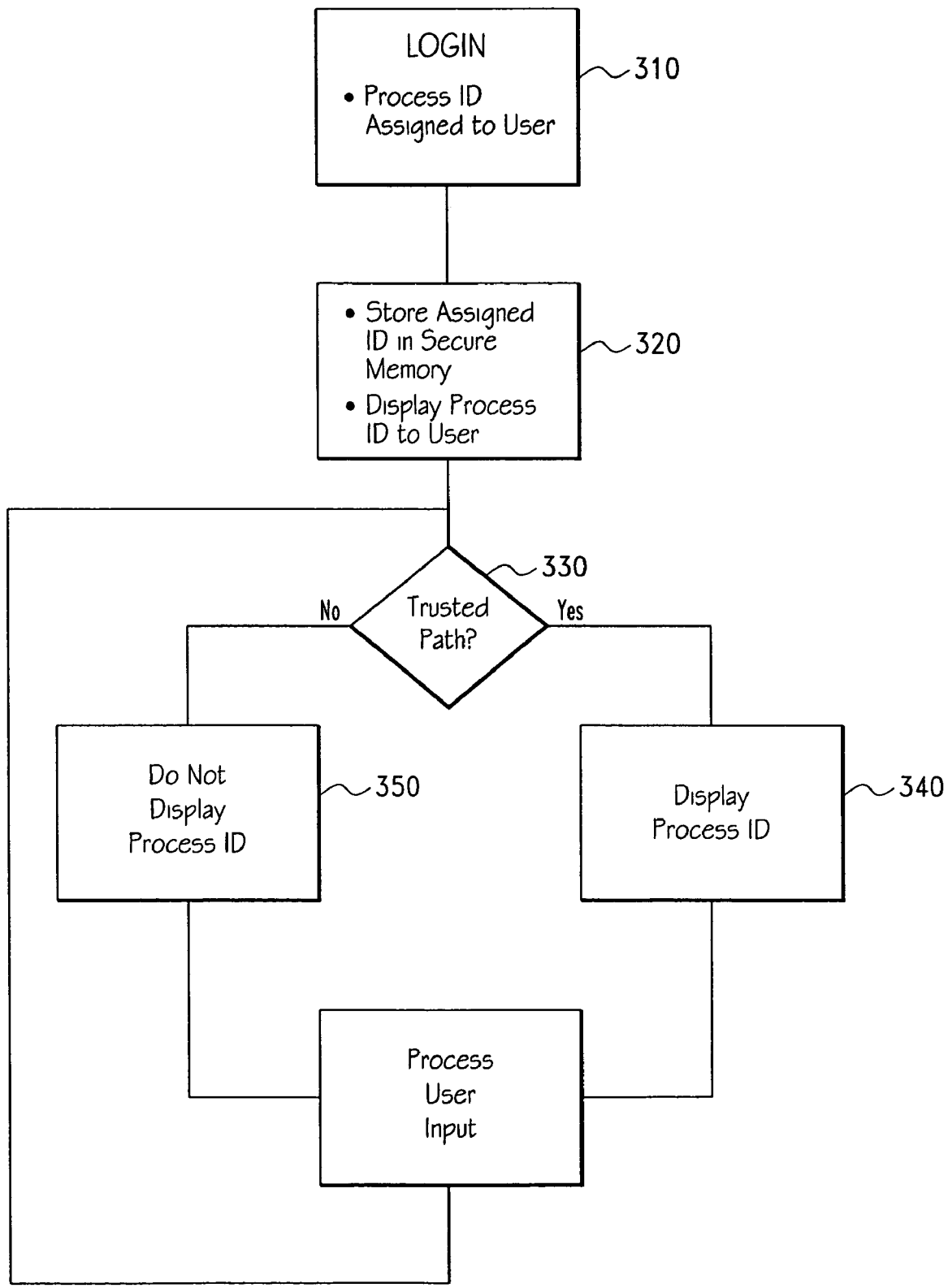
FIG. 6 is a flow diagram representing a method for verifying a trusted path.

FIG. 6 illustrates a flow diagram of this process. When the user initially logs into the computer system through the SSVR 12, a randomly generated process ID is assigned to the user. This activity is represented by process 310. In one embodiment, this process ID comprises alphabetic characters and is pronounceable. The pronounceable nature promotes user retention of the ID. The process ID is then stored in trusted memory by the SSVR 12 and displayed to the user by the SSVR 12 at process 320.

During the course of the computing session, the TCB determines if the user is operating through a trusted path. This activity occurs at process 330. If the TCB determines that a trusted path is not established, the process ID will not be displayed to the user. This is noted at process 350.

The process ID is maintained in trusted code and memory, and is inaccessible to untrusted subjects. Each time a trusted path is established between the SSVR 12 and the user, the SSVR 12 displays the user's process ID at process 340. By observing the displayed ID, the user is assured that an actual trusted path has been established.

4.7 The Command Conveyor

As discussed above, the command conveyor (CC) 14 is a layer in the TCB 10 which comprises part of the trusted code. The CC 14 is utilized to ensure proper communication of trusted commands between the SSVR 12 and the process supporting the untrusted subject. As discussed, such an untrusted subject may include a UOS 20.

Associated with each physical terminal 30 is a command buffer. In some embodiments, a status code may be associated with each terminal. In a still other embodiments, one of five command states is also associated with each physical terminal. The command buffer is used to store the binary representation of the trusted command. The status code may be employed to provide the resulting execution status to the untrusted subject. The command states generally comprise five possibilities:
  (a) no command,
  (b) command submitted,
  (c) command in progress,
  (d) ignore finish, and
  (e) command done.

Figure 7:
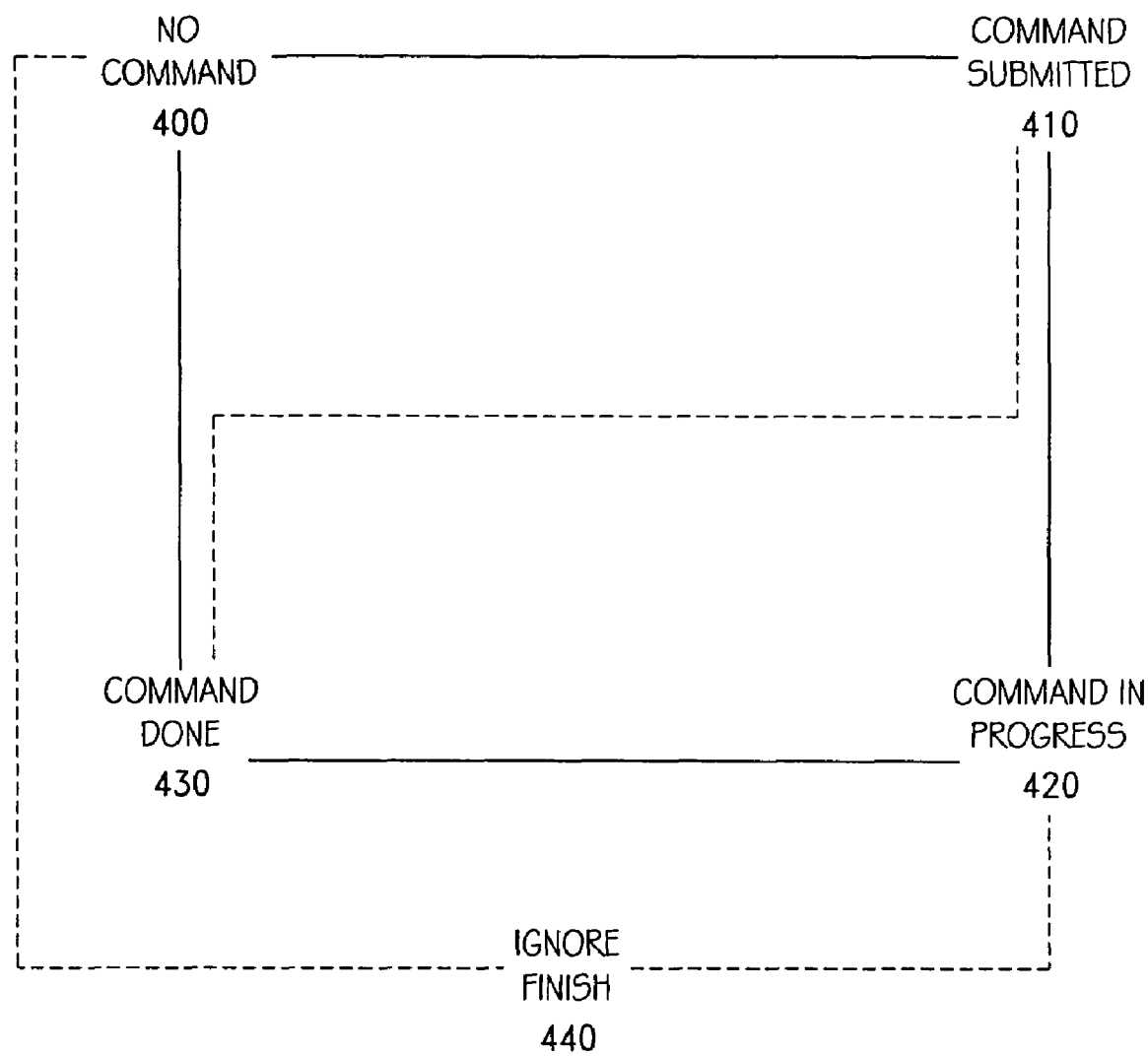
FIG. 7 is a state transition diagram of a further embodiment utilizing various command states.

These states are used to indicate the various states that may be encountered in the execution of a trusted command. FIG. 7 is state transition of the command states. A detailed explanation of these states and the statuses may be obtained from the following discussion.

4.8 Distribution of Processing of Trusted Commands

As discussed above, the TCB 10 "recognizes" two categories of commands. For the purposes of this specification "commands" include user instructions received through the use of command line interfaces, menu interfaces, direct manipulation interfaces or the like.

The first category includes "direct commands" issued while the user is operating in the SSVR 12 layer of the TCB 10, i.e., is interactively conversing with the TCB 10. As discussed above, it is desirable to limit the number of direct commands available to the user. The execution and processing of these direct commands is carried out using traditional methods known in the art.

The second category includes "trusted commands." These commands are issued by a user operating in a non-trusted computing environment, such as in the general UOS 20. In one embodiment these trusted commands are issued by a user operating in an untrusted virtual machine. FIGS. 4A and 4B illustrate the activity necessary to execute such a command.

If the user attempts to execute a trusted command, the parser residing in the general UOS 20 parses the trusted command string and converts it into a binary representation at process 70. In parsing the command, the untrusted code in the UOS 20 checks syntax and semantics, and prompts for missing parameters. Parsing strategies are well known in the art and will not be discussed herein.

From a security perspective, it is not required that the code in the UOS 20 perform an accurate translation of the user's commands into a parsed representation (binary representation). The confirmation mechanism, described below, is designed to catch such errors whether benign or malevolent.

Following parsing of the command, a process supporting the UOS 20 issues a call to the TCB, submitting to the TCB the identification of the terminal from which such command was issued, at process 80. In one embodiment, the virtual terminal from which the command was issued is submitted to the TCB. Such a call is processed by the CC 14 in the TCB 10. The CC 14 then determines which trusted subject submitted the command and copies the parsed representation into protected memory at process 90. In one embodiment this determination is made by asking VTerm to identify the physical terminal associated with the UOS's virtual terminal.

Such a submission of the binary representation will be successful only if the TCB 10 determines that the submitting terminal is connected to an active process.

Normally, in embodiments utilizing the command states, the command state of the submitting physical terminal is no command, which indicates that there is no trusted command submitted by that physical terminal or in progress. This state is represented by state 400 in FIG. 7. When the state is no command, the CC 14 saves the binary representation in the command buffer, and sets the physical terminal's state to command submitted, represented by transition state 410. Otherwise, the submission fails.

When the untrusted subject running in untrusted code receives indication from the TCB 10 that the command has been submitted, it requests the user to activate the secure-attention key. In one embodiment, the untrusted code in the UOS 20 will request that the user activate the BREAK key.

If the user activates a cancellation key, for example Ctrl-Y or Ctrl-C, instead of activating the secure-attention key, code in the general UOS 20 may cancel the trusted command. This can be accomplished by the untrusted code issuing a kernel call (i.e., a request by the untrusted subject of the security kernel) and informing the CC 14 that the command is to be aborted. If the CC 14 finds that the command has not been sent to the SSVR 12, the command is canceled. Similarly, if the user process in the UOS 20 is killed, the process rundown code may cancel the trusted command request. However, if the CC 14 finds that the command has already been sent it proceeds; because the user is already executing the command.

In embodiments employing command states, cancellation of the trusted command request results in the command state being changed from command submitted to no command. This process is indicated in FIG. 7.

If the user attempts to establish a trusted path at the same time the trusted command is sent to the TCB 10, then the TCB 10 must arbitrate; either of these requests may be processed first. If the secure-attention signal is processed first, the TCB 10 may defer the command submission, and a connection with the SSVR 12 is established. If the submission is processed first, then the user sees the confirmation screen as is described below.

If, when prompted, the user activates the secure-attention key, a trusted path is established between the user's physical terminal 30 and the SSVR 12 in the TCB 10. This configuration is illustrated by the dark line in FIG. 3. When the VT layer 16 detects the secure-attention (BREAK) key, it notifies the SSVR 12 which then establishes a trusted path in the trusted path-supporting process associated with the user's physical terminal 30.

Once the trusted path is established, the TCB 10 maintains exclusive control over the physical terminal 30. In one embodiment, untrusted code in the UOS 20 waits to be notified that the command has been completed. Thus, the user essentially bypasses the untrusted code, and converses only with trusted code. Thus, if the user's process in the general UOS 20 is killed, or the user's process terminates, or the general UOS 20 crashes, the trusted command may still be executed. The user will not be informed of any of these activities until the trusted command has been completed or abandoned.

Following establishment of the trusted path, the security requirements of the system require interaction between the user and the SSVR 12. This is necessary to execute commands which require the establishment of a trusted path. The Orange Book criteria, and/or the system's security goals, will determine which commands require this interaction as is generally discussed in Section 4.9 below.

The establishment of a trusted path in these instances is useful for several reasons. First, it allows the secure server to identify the specific user issuing the command. Second, the trusted path allows the user to review and approve (or reject) the requested action in a trusted fashion. This reduces the possibility of malicious untrusted software altering a command request, and allows for the detection of parsing errors.

FIG. 4B illustrates the activity occurring after control has passed to the TCB 10. As discussed above, the TCB 10 first establishes a trusted path at process 120. The TCB then checks to see if a trusted command has been submitted by the user. Untrusted code may then wait for the command to finish.

Once a trusted path has been established, the SSVR 12 will call the CC 14 to return the binary representation at process 130. In one embodiment, the CC 14 will first determine the command state of the physical user terminal 30. In a still further embodiment if the command state is command submitted 410 (FIG. 7), the CC 14 will return to the SSVR 12 the binary representation, and change the command state to command in progress 420. If the state is no command 400 or command done 430, the call will fail, and the SSVR 12 will display the SSVR prompt (SSVR>) to the user. An initial command state of command in progress 420 or ignore finish 440 implies a bug in the SSVR 12 and may result in the CC 14 crashing the TCB 10.

In these embodiments, if the command state was command submitted 410, then the CC 14 will return to the SSVR 12 the binary representation of the requested command.

4.9 Display of Command to User

Once the parsed command has been returned to the SSVR 12, the SSVR 12 will determine if the command requires confirmation at process 140 (FIG. 4B). Confirmation should generally be required for commands which request modification of information. Commands that do not alter the information, such as the viewing of information, should not generally require confirmation. For purposes of confirmation, redirecting the display into a file should be considered as viewing information.

The decision of whether a given command should require activation of the secure-attention key to execute depends on the basic security policy of the system. In one embodiment, secure-attention trusted commands are a mechanism for use by system managers, security managers, operators, and holders of special privileges.

Generally, a command which is not a direct command, is a secure-attention command if:
  a. it modifies a security kernel database in a security-relevant way; or
  b. it displays information on which a systems manager, security manager, or operator will base a security decision.

If the command is one that does not require confirmation, the TCB 10 enforces the system's security policy and determine if the user has the necessary access rights to execute the command at process 145. If this is the case the TCB 10 attempts to execute the binary representation at process 150. Since certain commands, e.g. commands that merely display information, do not change the state of the system, user confirmation is not required. There is no security problem in not confirming these commands since the system only allows users to view information to which they have access.

There are certain commands that change the state of the system may not require confirmation. Some commands may allow the user to turn on a file to receive the user's redirected output. This files are sometimes known in the art as "listing files." Generally, the turning on of a listing file is a confirmed command.

In situations where a listing file has been turned on (i.e., the output is redirected into this file) commands which normally display information may, by writing to the listing file, alter the state of the system. In these cases, confirmation of these commands is generally not required because the flow of information is constrained by the TCB's security rules.

When a command requesting the display of information is executed by the TCB 10, the SSVR 12 responds by displaying a complete representation of the requested command as well as the requested information, i.e. the standard human-readable representation of the command. In one embodiment, the SSVR 12 displays the function code, command modifiers, and command parameters all in unambiguous notation. If employed, the process ID may also be displayed.

Thus, if the user's command is improperly parsed, or modified in an unauthorized manner, the user will be able to observe the difference. This inhibits an untrusted subject from fooling a user into believing that he or she is observing the results of a submitted command, when in fact that command had actually been altered.

If the command requested is one for which confirmation is required, the SSVR 12 displays a standard human-readable representation of what is about to be done to the user terminal at process 170. The code representing each command should produce a different display, unless the commands have the same effect. As previously discussed, the re-display of the action that a binary representation will perform is less complex than the parsing of the original command. This is in part because by definition there is only one standard human-readable representation for each parsed command.

By parsing the command in untrusted code, and verifying the request in trusted code, the overall complexity of the TCB 10 is decreased. The display of "what is about to be done" may of course vary from one command to another.

If the command's purpose is to add a record to a database or create an object, the display may contain what the new record will contain, or what the attributes of the object will be if the command is confirmed.

If a particular database or object is to be modified, the display may show what the updated data will look like, or what the attributes of the object will be if the command is confirmed. For commands which remove an existing object, or delete an existing file, the display may show the record or object.

Generally, for both adding/creating and modifying, the data packet representing the submitted command may contain fields for the objects attributes, such as its name, its size and its protection. For each of these fields, the packet may also have a flag indicating whether the field is meaningful. These flags indicating meaningful fields may be know as "field selectors."

In add/create commands, the TCB may supply default values for unselected fields. In commands which modify a database entry or object, unselected fields may retain their previous values.

To aid the user, the selected fields may be highlighted when displayed for confirmation. Such highlighting may be accomplished by methods known in the art (e.g., by using escape sequences that begin and end reverse video). This highlighting draws the users attention to the fields that have non-default or changed values and helps to protect the user from tricks by untrusted code.

When an audit record is produced of the confirmation display via the sink (discussed below) the reverse-video escape sequences may be replaced with dashes on the next line. Example:

Name: JOHN.DOE

- - - -

This change permits the audit record to be properly displayed on a wide variety of devices, even simple line printers.

Alternative embodiments are envisioned in which the TCB checks each field's value: for add/create commands the fields that have non-default values are highlighted; and for modify commands the fields that are changing are highlighted. This "field comparison" approach generally results in less highlighting.

Generally, for every command, every packet field is displayed on the screen, except for fields ignored by the particular command.

In the cases when a database will not be modified, the display generated by the SSVR 12 may express what action is to be done. In this manner, the possibility of an erroneous confirmation is reduced since the user is requested to confirm the results, not the command.

The SSVR 12 may also display a list of user protection attributes so that the user knows what role he or she is exercising. The user is required to confirm explicitly (Yes or No) the action requested. In a general embodiment, the TCB 12 displays for confirmation the results which would occur if the command is executed.

Generally, any information in the binary representation that is displayed is first validated. This information is checked once to ensure that certain requirements are met, e.g., to ensure that the counts of array elements are within array bounds (since out-of-bounds conditions could provide an opportunity for entry into the TCB by illicit software).

Before displaying the contents of a packet containing the binary representation of the command, anything that could cause the formatting code to malfunction may be validated. Generally, such candidates for validation could include anything used to index into something else. Specific examples include the PASCAL language's implementation of varying strings (a count followed by an array of characters; the count is checked to be less than or equal to the character array size), and numbers that represent keywords (their value is checked before it is used to index into an array of keyword text strings). Further methods of validation are well known in the art and will not be discussed herein.

In one embodiment, the replies that the user may make to the confirmation prompt are "yes", "no", Ctrl-C, Ctrl-Y, or the BREAK key. No default responses exist in this embodiment. For each user response, the secure server may display a message restating the response. If the response was "yes" or "no", the secure server 12 displays an indication of the computing session in the UOS 20 when it is being be resumed after command completion.

If, however, the user activates the Ctrl-Y, Ctrl-C, or the BREAK key, the command will be aborted. In one embodiment, the CC then changes the command status code to negative. This may be done to inform the submitting process that the command has been aborted. In these cases a direct session with the SSVR 12 will be established at process 300. In these instances, the user must explicitly issue a resume command to return to the session in the UOS 20.

If the user confirms the results or command, by replying with "yes", or if the command does not require confirmation, the TCB 10 enforces the system's security policy at process 145. At this process the TCB 10 determines if the user has the necessary access privileges to perform the requested activity. If the user has the required access rights, the SSVR 12, along with other code in the TCB 10 attempts to execute the command in a conventional manner.

Upon attempted execution of the command, the SSVR 12 may inform the CC 14 of the execution status. In some high-security situations, concern for information flow from trusted to untrusted code will prevent informing the CC 14. The CC 14 may change the command status to indicate the SSVR 12 response. In addition, in alternate embodiments, the CC 14 changes the command state from command in progress 420 (FIG. 7) to command done 430. In these cases, the CC 14 notifies the submitting untrusted subject by traditional methods (e.g., by advancing an eventcount for that process). The SSVR 12 then reestablishes the terminal connection with the computing session in the UOS 20 from which the command was executed.

In embodiments utilizing the status code, if the user responds with "no", the secure server informs the session in the UOS 20 that the command was not executed (negative status code). If command states are also employed, the SSVR 12 changes the command state to command done, and re-establishes the user's session in the general UOS 20 at process 160.

If the trusted command requested by the user is a command which affects one of the system databases, and the database record was changed by some other process or user between the time the confirmation display appeared and the current user confirmed the command, then the SSVR 12 displays a message indicating that a change has been made and requests reconfirmation. In this case, the SSVR 12 waits for a response as if it were the first time the information was displayed.

To ensure that if two users attempt to modify the same element at the same time, only one request is rejected, the TCB may utilize identifiers known as "modification counts" (mod-counts).

Each element of key databases (or registries) may contain a modification count. This mod-count is advanced after each modification and thus identifies how many modifications have been made to the database element. Thus, when a user attempts to modify a database element, the SSVR 12 first obtains that database element's mod-count. After the user has confirmed the request, the TCB 10 checks the mod-count in the request against the current mod-count.

A different mod-count indicates that a change has been made to the database element, and the user is asked to reconfirm the request since the result previously confirmed by the user is not what the result would actually be.

To deter malicious users or subjects from preventing the execution of trusted commands, two measures may be taken. First, certain access rights may be required to change certain database elements. Second, the mod-count should not be advanced when a modification is requested that does not change the database element. In this manner, attempts by malicious subjects to prevent execution of a trusted command, by rapidly and spuriously causing the mod-count to be incremented, will be inhibited.

Once activity in the SSVR 12 is completed, the user's session in the general UOS 20 is reestablished. In one embodiment, this may be accompanied by the CC 14 informing the untrusted subject of the status of the submitted command. The untrusted code in the general UOS 20 then wakes-up the untrusted process running in the UOS 20 at process 160. In one embodiment, before the TCB 10 passes the user to the untrusted subject, the SSVR 12 prompts the user to activate a carriage return. This step is necessary to inform the user that he/she is being placed into an untrusted environment.

4.10 The SSVR as an Audit Recorder

In one embodiment, the SSVR 12 audits (i.e., creates an audit trail by writing to an audit or log file) at the command level. For direct commands the SSVR 12 audits both the command line and the final status of the command. For trusted commands (secure-attention commands), the SSVR 12 audits both the confirmation display and the final status of the command.

To record the confirmation displays, the SSVR 12 defines a portion of memory to store the strings of information sent by the SSVR 12 to the user's terminal. In one embodiment, this portion of memory is known as the "sink." Only the strings that comprise the SSVR's confirmation screens are placed in the sink.

Strings may be appended to the sink only when the sink is opened. The sink is opened when the SSVR 12 begins to service a trusted command. The sink may be closed after the user has responded to the confirmation prompt, or before the display of certain requested information. The information stored in the sink does not include the user input to any prompts.

The information stored in the sink is maintained for auditing purposes and may be utilized according to traditional auditing practices.

4.11 Confirmation by Others than the Submitting User

In some situations it may be desirable for users other than the submitting user to confirm a secure-attention command. Such a situation may arise if there is a certain application or command file that includes a privileged command but is needed to be run by a large number of users. In the cases where it may be impracticable to grant all of the users the necessary access rights, it may be possible to grant one user the necessary rights, and to allow him/her to confirm this command for the other users.

Such non-submitting user confirmation may be accomplished by having the code in the untrusted subject lie about which user is submitting the command. For example, the code in the UOS 20 may ensure that certain commands are always sent to the TCB 10 as if they had been submitted by a selected user.

One purpose of this select user would be to confirm these certain commands for the other users. After a non-select user submits one of the certain commands, the selected user will be notified that there is a submitted command waiting. The select user may then observe the confirmation display. If the select user determines that the command submitted was a legitimate command, he/she may confirm the command. Otherwise, the original users attempt to execute the command fails.

4.12 Implementation Approaches

The method for executing trusted commands described above may be implemented through the use of appropriate software. The actual design and coding is a matter of routine for those skilled in the art having the benefit of this disclosure. Such a design will of course vary with the hardware platform and other factors associated with the specific desired implementation.

Figure 5:
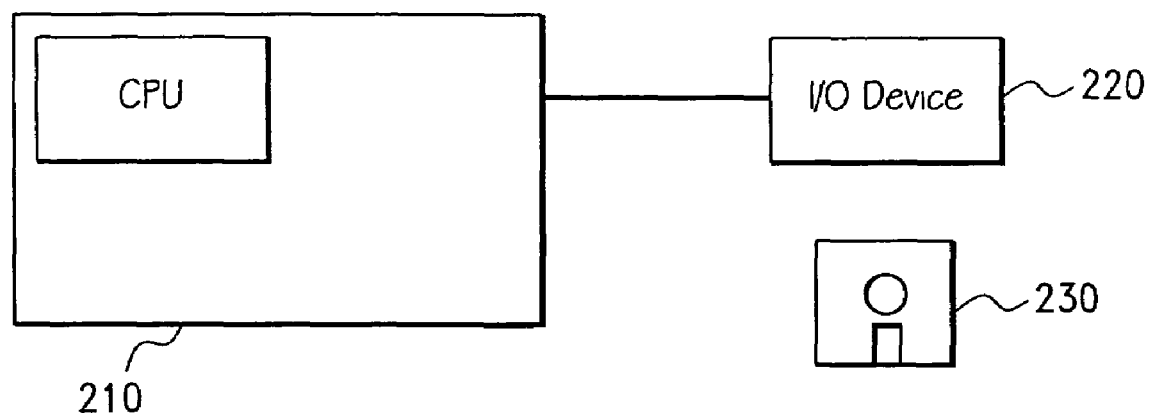
FIG. 5 illustrates one method of implementing the invention.

FIG. 5 illustrates one such method for implementing the present invention. A programmable machine comprises a central processing unit (CPU) 210, and an input/output (I/O) device 220. The I/O unit 220 is capable of reading and transmitting stored programming instructions from known storage media 230. The CPU 210 is capable of processing these instructions and executing the programming steps represented on media 230. Such systems are well known in the art and will not further be described.

To implement the invention, the necessary programming steps are stored on storage media 230 by traditional methods. The storage media 230 is then read by the I/O unit 220 and the programming instructions are transmitted to the CPU 210. The CPU 210 reads and interprets the instructions, and may thereafter carry out the method of the invention.

What is claimed is:

1. A machine-executed method for verifying the existence of a trusted path to a user in a computing system, the computer system including a trusted computing environment, the method comprising the following steps conducted in sequence:
   (a) upon login by a user, automatically assigning a process identifier to the user in the trusted computing environment;
   (b) storing the assigned process identifier in trusted memory;
   (c) establishing a trusted path between the user and the trusted computing environment;
   (d) through the trusted path, displaying the process identifier to the user; and
   (e) upon the user's subsequent entry into the trusted computing environment, automatically displaying the process identifier to the user through the trusted path so that the user is assured that the trusted path has been established.

2. The method of claim 1, wherein the process identifier is a randomly or pseudo-randomly generated group of alphanumeric characters.

3. An automatic data processing machine programmed to execute the method of claim 2.

4. An automatic data processing machine comprising means for performing the method steps of claim 2.

5. A program storage device readable by a machine and tangibly embodying a representation of a program of instructions adaptable to be executed by said machine to perform the method of claim 2.

6. The method of claim 1, wherein the process identifier is pronounceable.

7. An automatic data processing machine programmed to execute the method of claim 6.

8. An automatic data processing machine comprising means for performing the method steps of claim 6.

9. A program storage device readable by a machine and tangibly embodying a representation of a program of instructions adaptable to be executed by said machine to perform the method of claim 6.

10. An automatic data processing machine programmed to execute the method of claim 1.

11. An automatic data processing machine comprising means for performing the method steps of claim 1.

12. A program storage device readable by a machine and tangibly embodying a representation of a program of instructions adaptable to be executed by said machine to perform the method of claim 1.

13. An apparatus for executing a trusted command that is issued by a user comprising:
   (a) untrusted parsing means for generating a trusted parsed command;
   (b) trusted means for receiving the trusted parsed command via a trusted path;
   (c) means for displaying a representation of the trusted parsed command to the user for verification; and
   (d) trusted means for executing the verified trusted parsed command.

14. The apparatus according to claim 13, where the display means automatically displays the representation of the trusted parsed command to the user for verification.

15. The apparatus according to claim 13, further comprising:
   means for initially inputting a process identifier by the user; and
   memory for storing the process identifier, wherein the representation of the trusted parsed command displayed to the user for verification constitutes the process identifier.

16. An apparatus for controlling the execution by a machine of a trusted command that is issued by a user with user identification data comprising:
   (a) untrusted parsing means for generating a parsed trusted command;
   (b) means, readable by the machine, for causing the machine to receive the user identification data from the user;
   (c) means, readable by the machine, for causing the machine to receive the parsed trusted command from the untrusted parsing means;
   (d) means, readable by the machine, for causing the machine to perform a security check on the parsed trusted command and a security check on the user identification data; (e) means, readable by the machine, for causing the machine to execute the parsed trusted command;
   (f) means, readable by the machine, for causing the machine to display a representation of the parsed command to the user;

(g) means, readable by the machine, for causing the machine to receive a signal from the user signifying whether the displayed representation accurately represents the trusted command; and (h) means, readable by the machine, for preventing the machine from executing the trusted command if the signal signifies that the parsed command does not accurately represent the trusted command.

17. An apparatus for controlling the execution by a machine of a trusted command that is issued by a user with user identification data comprising:

(a) untrusted parsing means for generating a parsed trusted command;

(b) means, readable by the machine, for causing the machine to receive the user identification data from the user;

(c) means, readable by the machine, for causing the machine to receive the parsed trusted command from the untrusted parsing means;

(d) means, readable by the machine, for causing the machine to perform a security check on the parsed trusted command and a security check on the user identification data;

(e) means, readable by the machine, for causing the machine to execute the parsed trusted command (f) means, readable by the machine, for causing the machine to display a representation of the parsed command to a second user;

(g) means, readable by the machine, for causing the machine to receive a signal from the second user signifying whether the displayed representation accurately represents a legitimate command; and (h) means, readable by the machine, for preventing the machine from executing the trusted command if the signal signifies that the parsed command does not accurately represent a legitimate command.

* * * * *

UNITED STATES PATENT AND TRADEMARK OFFICE
CERTIFICATE OF CORRECTION

PATENT NO.        : 7,036,022 B1
APPLICATION NO. : 09/515384
DATED             : April 25, 2006
INVENTOR(S)       : Mary Ellen Zurko et al.

It is certified that error appears in the above-identified patent and that said Letters Patent is hereby corrected as shown below:

In column 6, line 28, delete "substantial" and insert -- substantially --, therefor.

In column 22, line 18, insert -- 18. The apparatus according to claim 27, further comprising: means, readable by the machine, for causing the machine to receive a signal from the user signifying whether the displayed representation accurately represents the trusted command; and means, readable by the machine, for preventing the machine from executing the trusted command if the signal signifies that the parsed command does not accurately represent the trusted command. --.

Signed and Sealed this

Twenty-first Day of April, 2009

JOHN DOLL
*Acting Director of the United States Patent and Trademark Office*